(12) United States Patent  (10) Patent No.: US 8,924,396 B2
Qiao  (45) Date of Patent: Dec. 30, 2014

(54) METHOD AND SYSTEM FOR SCORING TEXTS

(75) Inventor: Hong Liang Qiao, Concord (AU)

(73) Assignee: Lexxe Pty Ltd., North Strathfield, NSW (AU)

( * ) Notice: Subject to any disclaimer, the term of this patent is extended or adjusted under 35 U.S.C. 154(b) by 1058 days.

(21) Appl. No.: 12/884,395

(22) Filed: Sep. 17, 2010

(65) Prior Publication Data

US 2011/0072011 A1 Mar. 24, 2011

Related U.S. Application Data

(60) Provisional application No. 61/243,953, filed on Sep. 18, 2009.

(51) Int. Cl.
G06F 17/30 (2006.01)

(52) U.S. Cl.
CPC .................. *G06F 17/30687* (2013.01)
USPC ............... 707/748; 707/723; 707/754

(58) Field of Classification Search
CPC .......... G06F 17/3053; G06F 17/30699; G06F 17/30867
USPC ............ 707/723, 748, 752, 722, 754
See application file for complete search history.

(56) References Cited

U.S. PATENT DOCUMENTS

| 5,151,857 | A | 9/1992 | Matsui |
| 7,213,205 | B1 | 5/2007 | Miwa et al |
| 7,290,207 | B2* | 10/2007 | Colbath et al. ............... 715/234 |
| 7,376,635 | B1* | 5/2008 | Porcari et al. .................. 1/1 |
| 7,809,568 | B2* | 10/2010 | Acero et al. ................. 704/257 |
| 8,015,183 | B2 | 9/2011 | Frank |
| 2002/0178152 | A1* | 11/2002 | Azzam ............................ 707/3 |
| 2003/0115187 | A1* | 6/2003 | Bode et al. ..................... 707/3 |

(Continued)

FOREIGN PATENT DOCUMENTS

| EP | 2045728 | 4/2009 |
| EP | 2048585 | 4/2009 |

(Continued)

OTHER PUBLICATIONS

Lin, Chin-Yu et al., "Identifying Topics by Position", Proceeding ANLC '1997 Proceedings of the fifth conference on Applied natural language processing, pp. 283-290[retrieved on Jul. 11, 2013]. Retrieved from the Internet< URL: http://dl.acm.org/citation.cfm?id=974599>.*

(Continued)

*Primary Examiner* — Phong Nguyen

(57) ABSTRACT

A computer-implemented method, computer-readable medium and system for scoring a text are disclosed. Themes within one or more texts may be determined and used to score each text, where an overall score for each text may indicate a respective importance and/or value of each text. The score for each text may be determined based upon a number of themes, type of themes, frequency of theme elements associated with the themes, distribution of theme elements associated with the themes, location of themes in the text, some combination thereof, etc. In this manner, the importance or value of one or more texts may be determined more accurately using information within each text with reduced reliance upon external information. Additionally, more relevant search results can be returned to a user by using internal information to perform ranking operations and/or filtering operations associated with a search.

30 Claims, 13 Drawing Sheets

(56) References Cited

U.S. PATENT DOCUMENTS

| | | | |
|---|---|---|---|
| 2003/0130993 A1 | | 7/2003 | Mendelevitch et al. |
| 2003/0140309 A1* | | 7/2003 | Saito et al. .................. 715/500 |
| 2004/0054661 A1 | | 3/2004 | Cheung et al. |
| 2005/0108212 A1 | | 5/2005 | Karimisetty et al. |
| 2005/0154690 A1 | | 7/2005 | Nitta et al. |
| 2005/0267871 A1 | | 12/2005 | Marchisio et al. |
| 2006/0010111 A1 | | 1/2006 | Jones et al. |
| 2006/0031216 A1 | | 2/2006 | Semple et al. |
| 2006/0041549 A1 | | 2/2006 | Gundersen et al. |
| 2006/0173821 A1 | | 8/2006 | Hennum et al. |
| 2006/0235689 A1 | | 10/2006 | Sugihara et al. |
| 2007/0011154 A1* | | 1/2007 | Musgrove et al. ............... 707/5 |
| 2007/0016563 A1* | | 1/2007 | Omoigui ........................ 707/3 |
| 2007/0078822 A1* | | 4/2007 | Cucerzan et al. ............... 707/3 |
| 2007/0106657 A1 | | 5/2007 | Brzeski et al. |
| 2007/0288421 A1* | | 12/2007 | Chakrabarti et al. ............ 707/1 |
| 2008/0114750 A1 | | 5/2008 | Saxena et al. |
| 2008/0120279 A1 | | 5/2008 | Xue |
| 2008/0172377 A1 | | 7/2008 | Kapadia et al. |
| 2009/0043749 A1 | | 2/2009 | Garg et al. |
| 2009/0055390 A1 | | 2/2009 | Maeda et al. |
| 2009/0089047 A1 | | 4/2009 | Pell et al. |
| 2009/0182737 A1 | | 7/2009 | Melman |
| 2009/0248511 A1 | | 10/2009 | Mehta et al. |
| 2013/0060785 A1* | | 3/2013 | Sweeney et al. ............. 707/748 |

FOREIGN PATENT DOCUMENTS

| | | |
|---|---|---|
| KR | 1020000050225 A | 8/2000 |
| KR | 1020070052028 | 5/2007 |
| KR | 1020080017686 A | 2/2008 |

OTHER PUBLICATIONS

Demartini, Gianluca, "ARES: a Retrieval Engine Based on Sentiments," Proceedings of the 33rd European Conference on Advances in Information Retrieval, Apr. 18, 2011, pp. 722-755.

Hu et al., "Mining and Summarizing Customer Reviews," Proceedings of the Tenth ACM SIGKDD International Conference on Knowledge Discovery and Data Mining, 2004, pp. 168-177.

Liu et al., "Opinion Observer: Analyzing and Comparing Opinions on the Web," Proceedings of the 14th International Conference on World Wide Web, pp. 342-351, 2005.

Liu et al., "Opinion Searching in Multi-Product Reviews," Proceedings of the Sixth IEEE International Conference on Computer and Information Technology, 2006, pp. 1-6.

Magnini et al., "A WordNet-Based Approach to Named Entities Recognition," in proceedings of the SemaNet'02 workshop entitled "Building and Using Semantic Networks," 2002, pp. 1-7.

Popescu et al., "Extracting Product Features and Opinions from Reviews," Proceedings of the Conference on Human Language Technology and Empirical Methods in Natural Language Processing, 2005, pp. 1-8.

Qiao, Hong Liang, "Lexxe Search Engine," from http://www.hcsnet.edu.au, Sep. 2006, pp. 1-25.

* cited by examiner

114

| Theme | Theme Element |
|---|---|
| Landmark | White House |
| | Golden Gate Bridge |
| | Winchester Mystery House |
| | Mission Santa Clara |
| President | Barack Obama |
| | George Bush, Jr. |
| | Bill Clinton |
| | George Bush, Sr. |
| Food | Bread |
| | Meat |
| | Fruit |
| | Nuts |

| Standard Form | Token |
|---|---|
| Speak | Speaks |
| | Spoke |
| | Spoken |
| | Speaking |
| George Bush, Jr. | George Walker Bush |
| | G. W. Bush |
| | G. Bush |
| | Bush, George W. |

| Attribute | Value Or Range | Score |
|---|---|---|
| Frequency | 0% To 20% | 5 |
| | 20% To 40% | 10 |
| | 40% To 60% | 15 |
| | 60% To 80% | 20 |
| | 80% To 100% | 10 |
| Distribution | 0-10 Words | 5 |
| | 11-30 Words | 20 |
| | 31-60 Words | 15 |
| | 61-100 Words | 10 |
| | 100+ Words | 5 |
| Location | Beginning And End Of Text | 30 |
| | Beginning Of Text | 15 |
| | End Of Text | 15 |
| | Neither Beginning Nor End Of Text | 0 |

| Text | Theme | Theme Type | Score |
|---|---|---|---|
| Text 1 | Theme A | Major | 91 |
| | Theme B | Major | 87 |
| | Theme C | Complementary | 62 |
| Text 2 | Theme B | Major | 95 |
| | Theme D | Minor | 25 |
| | Theme A | Minor | 13 |
| Text 3 | Theme G | Major | 85 |
| | Theme A | Complementary | 65 |
| | Theme D | Complementary | 52 |
| | Theme F | Potential Major | 46 |

FIGURE 8

METHOD AND SYSTEM FOR SCORING TEXTS

RELATED APPLICATIONS

The present application claims the benefit of U.S. Provisional Patent Application No. 61/243,953, filed Sep. 18, 2009, entitled "SYSTEM AND METHODS FOR RANKING TEXTUAL INFORMATION AND SEARCH RESULTS BASED ON INFORMATIVITY," naming Hong Liang Qiao as the inventor. That application is incorporated herein by reference in its entirety and for all purposes.

BACKGROUND OF THE INVENTION

Conventional search engines typically rank search results using external information such as information from sources other than the webpages being ranked. For example, a conventional search engine may use the number of external links to a particular webpage to determine the importance of the particular webpage. The external links may reside in other sources (e.g., webpages, documents, etc.) and may direct a user to the particular webpage. In this manner, the conventional search engine may rank each webpage based upon a respective number of external links to each webpage.

Although external information is commonly used by conventional search engines to perform searches and rank webpages, it is often a poor indicator of the importance or value of each webpage. For example, there may be few or no external links pointing to a potentially important document, and therefore, the document may be not be returned or ranked lower than it should be by a conventional search engine. As another example, if a statue of a famous person has recently been defaced, a search using a conventional search engine for autobiographical information about the famous person may instead return a multitude of less-important results related to the defacing of the statue. As such, a user may be unable to locate webpages with more important or valuable information using a conventional search engine which relies on external information.

SUMMARY OF THE INVENTION

Accordingly, a need exists to improve determination of the importance or value of a webpage or other text. Additionally, a need exists to provide more relevant search results responsive to a search for content. Embodiments of the present invention provide novel solutions to these needs and others as described below.

Embodiments of the present invention are directed to a computer-implemented method, computer-readable medium and system for scoring a text. More specifically, themes within one or more texts may be determined and used to score each text, where an overall score for each text may indicate a respective importance and/or value of each text. The score for each text may be determined based upon a number of themes, type of themes, frequency of theme elements associated with the themes, distribution of theme elements associated with the themes, location of themes in the text, some combination thereof, etc. In this manner, the importance or value of one or more texts may be determined more accurately using information within each text (e.g., internal information) with reduced reliance upon external information (e.g., a number of hyperlinks pointing to a particular document). Additionally, more relevant search results can be returned to a user by using internal information to perform ranking operations and/or filtering operations associated with a search.

In one embodiment, a method of scoring a text includes determining a plurality of themes associated with a plurality of portions of the text, wherein each portion of the plurality of portions comprises at least one respective character. A plurality of scores are assigned to the plurality of themes, wherein each score of the plurality of scores corresponds to a respective theme of the plurality of themes. An overall score is determined for the text based on the plurality of scores.

In another embodiment, a computer-readable medium may have computer-readable program code embodied therein for causing a computer system to perform a method of scoring a text based on a content of the text. And in yet another embodiment, a system may include a processor and a memory, wherein the memory includes instructions that when executed by the system implement a method of scoring a text based on a content of the text.

BRIEF DESCRIPTION OF THE DRAWINGS

The present invention is illustrated by way of example, and not by way of limitation, in the figures of the accompanying drawings and in which like reference numerals refer to similar elements.

FIG. 4 shows an exemplary theme element database in accordance with one embodiment of the present invention.

FIG. 5 shows an exemplary token database in accordance with one embodiment of the present invention.

FIG. 7 shows an exemplary attribute scoring database in accordance with one embodiment of the present invention.

FIG. 8 shows an exemplary text scoring database in accordance with one embodiment of the present invention.

DETAILED DESCRIPTION OF THE INVENTION

Figure 1:
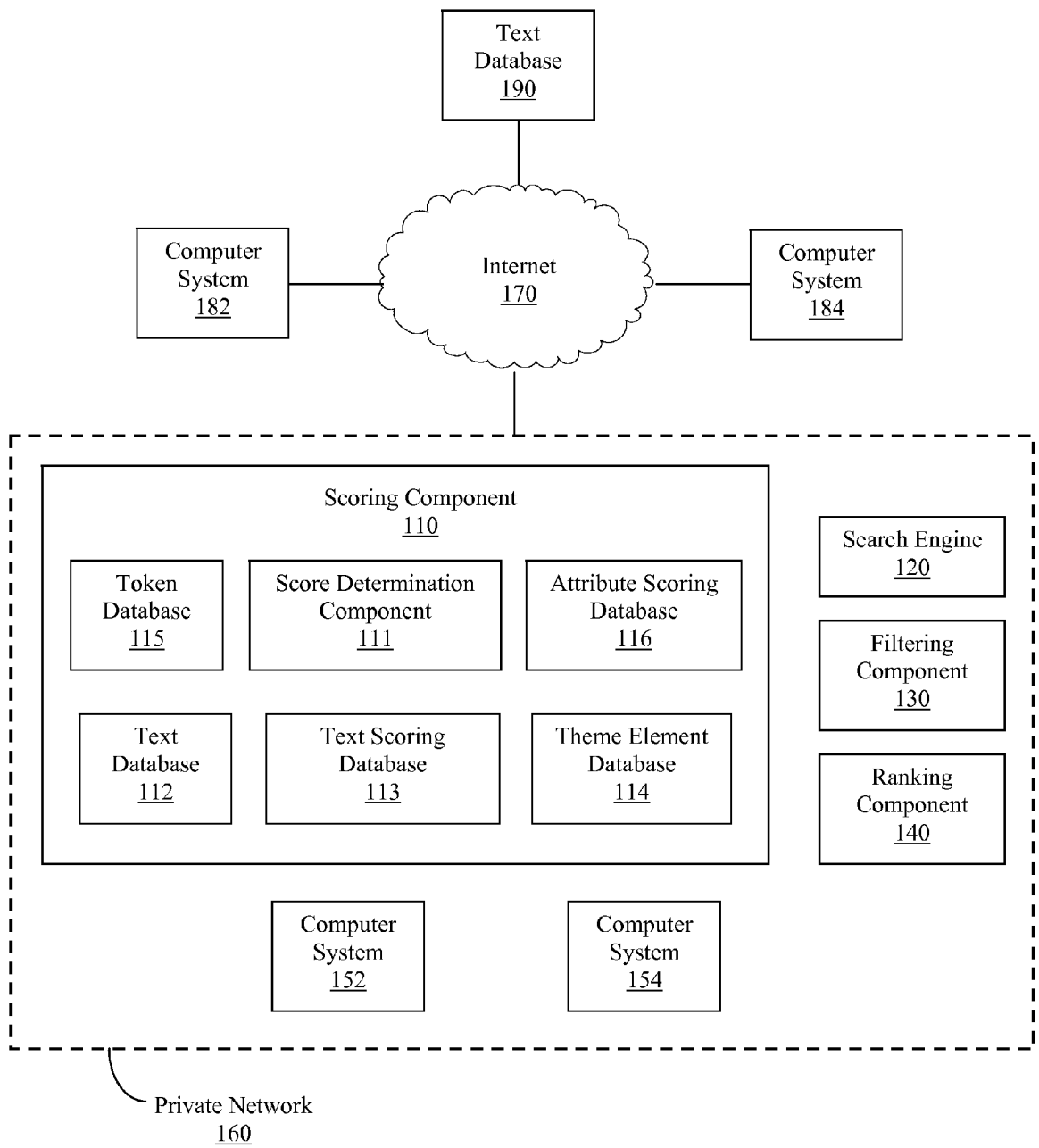
FIG. 1 shows an exemplary system for scoring one or more texts in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "accepting," "accessing," "adding," "analyzing," "applying," "assembling," "assigning," "associating," "calculating," "capturing," "combining," "communicating," "comparing," "collecting," "creating," "defining," "depicting," "detecting," "determining," "displaying," "establishing," "executing," "filtering," "generating," "grouping," "identifying," "initiating," "interacting," "modifying," "monitoring," "moving," "outputting," "performing," "placing," "presenting," "processing," "programming," "providing," "querying," "ranking," "removing," "repeating," "sampling," "sorting," "storing," "subtracting," "transforming," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary system 100 for scoring one or more texts in accordance with one embodiment of the present invention. As shown in FIG. 1, score determination component 111 of scoring component 110 may determine a respective score for one or more texts stored in text database 112 based on internal information (e.g., in accordance with process 200 of FIG. 2), where the internal information may include a respective content (e.g., at least one theme) of each text. The results of the scoring may be stored in text scoring database 113.

The results of the scoring may be used to perform at least one operation associated with a search (e.g., in accordance with process 900 of FIG. 9) in one embodiment. For example, filtering component 130 may access respective scores determined for each text and use the respective scores to filter the texts (e.g., select or identify a subset of the texts with scores above a predetermined threshold, etc.). The filtering may be performed prior to the performance of a search (e.g., to identify a subset of texts on which one or more searches is performed by search engine 120) and/or subsequent to the performance of a search (e.g., to identify a subset of results of a search performed by search engine 120). As another example, ranking component 140 may access respective scores determined for each text and use the respective scores to rank the texts (e.g., arrange the texts in order of increasing score, arrange the texts in order of decreasing score, etc.). The ranking may be performed prior to the performance of a search (e.g., to order texts on which one or more searches is performed by search engine 120) and/or subsequent to the performance of a search (e.g., to arrange or order results of a search performed by search engine 120). In this manner, embodiments of the present invention enable more relevant search results to be returned to a user by using internal information to score texts.

In one embodiment, embodiments of the present invention may reduce reliance upon external information (e.g., a number of hyperlinks pointing to a particular document) to further improve the determination of the importance and/or value of at least one text, to improve searches for at least one text or other operations (e.g., filtering, ranking, etc.) related to searches for at least one text, etc. For example, where relatively few external links (e.g., hyperlinks) point to a more important or valuable text, the importance and/or value of the text may be more accurately determined using internal information compared to conventional solutions that rely upon external information to determine the importance and/or value of the text (e.g., which would determine that the importance and/or value of the text is relatively low given the relatively small number of hyperlinks pointing to the text). As another example, where a relatively large number of external links point to a less important or valuable text, the importance and/or value of the text may be more accurately determined using internal information compared to conventional solutions that rely upon external information to determine the importance and/or value of the text (e.g., which would determine that the importance and/or value of the text is relatively high given the relatively large number of hyperlinks pointing to the text).

In one embodiment, a search may be performed (e.g., by search engine 120) within intranet or private network 160 (e.g., of at least one text stored in text database 112) and results of the search may be provided to at least one computer system (e.g., 152, 154, etc.) within the private network. In one embodiment, one or more texts within text database 112 may include confidential information and/or may include relatively few or no hyperlinks to other texts within text database 112. Alternatively, a search may be performed (e.g., by search engine 120) at least partially outside private network 160 (e.g., on at least one text within text database 190, etc.). In this case, results of the search may be provided to at least one computer system within private network 160 (e.g., 152, 154, etc.) and/or at least one computer system outside private network 160 (e.g., 182, 184, etc.).

Private network 160 may include any number of computer systems or devices which can communicate with limited or no internet connectivity. Computer systems or devices within private network 160 may be coupled by a local area network (LAN), virtual private network (VPN), or the like.

Although FIG. 1 shows a specific number and arrangement of components, it should be appreciated that system 100 may have a different number and/or arrangement of components in other embodiments. Additionally, although FIG. 1 shows scoring component 110 with specific components (e.g., score determination component 111, text database 112, text scoring database 113, theme element database 114, token database 115, attribute scoring database 116, etc.), it should be appreciated that scoring component 110 may have a different number of components in other embodiments. For example, one or more of the databases (e.g., text database 112, text scoring database 113, theme element database 114, token database 115, attribute scoring database 116, some combination thereof, etc.) may be located externally to scoring component 110 in one embodiment. Further, it should be appreciated that one or more components of private network 160 may communicate via Internet 170 in one embodiment.

Figure 2:
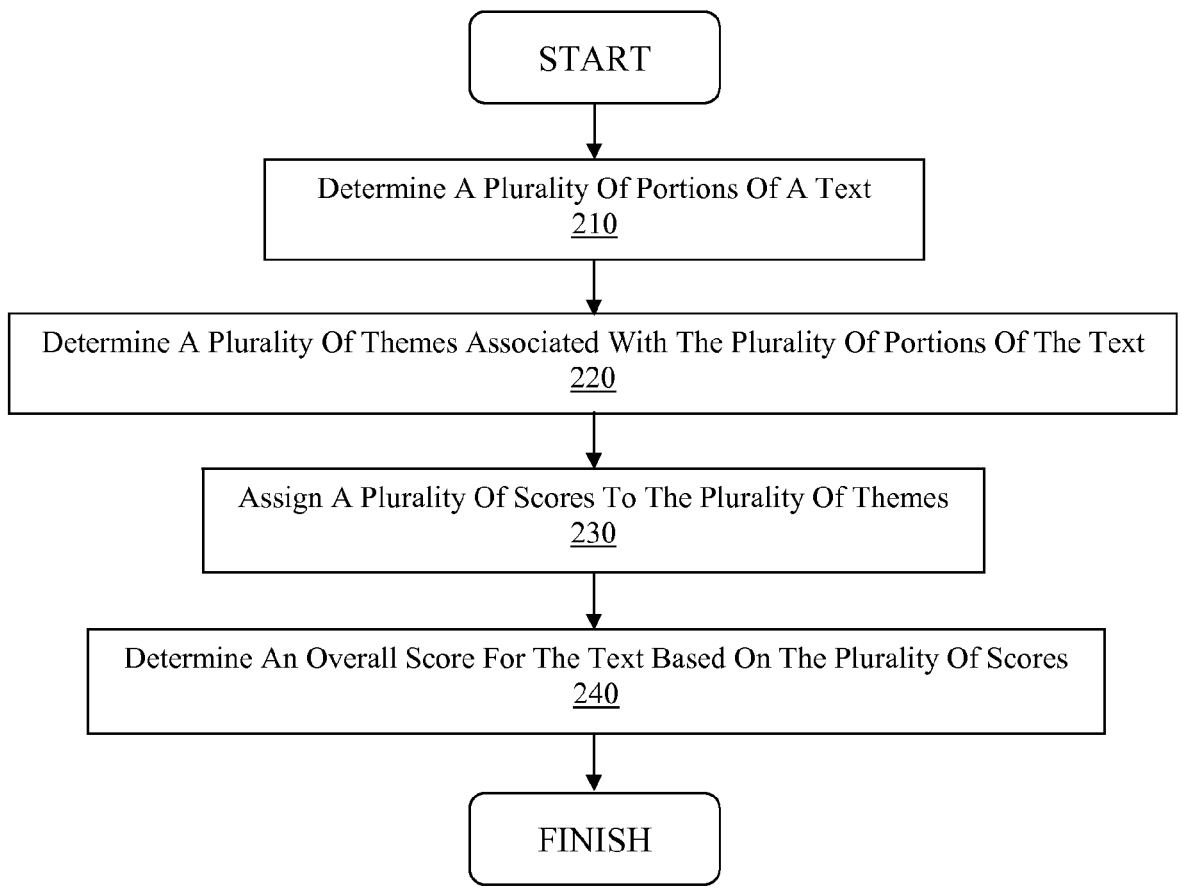
FIG. 2 shows a flowchart of an exemplary computer-implemented process for scoring one or more texts in accordance with one embodiment of the present invention.

FIG. 2 shows a flowchart of exemplary computer-implemented process 200 for scoring one or more texts in accordance with one embodiment of the present invention. As shown in FIG. 2, step 210 involves determining a plurality of portions of a text. The text may be a webpage, an electronic document (e.g., Microsoft Word document, Microsoft Excel spreadsheet, Adobe PDF, etc.), an electronic book, etc. Each portion of the text determined in step 210 may include at least one respective character (e.g., letter, number, symbol, icon, etc.). For example, the sentence "Barack Obama lives in the White House" may be found to include three separate portions: "Barack Obama;" "lives in;" and "White House." In one embodiment, the plurality of portions may be determined in step 210 using phrase chunking (e.g., based on statistics, grammar rules, etc.) or a similar process.

Step 220 involves determining a plurality of themes associated with the plurality of portions of the text (e.g., determined in step 210). In one embodiment, the number of portions of the text may be larger than the number of themes (e.g., not every portion of the text may be associated with a theme). Each theme determined in step 220 may be associated with at least one theme element (e.g., one or more words which are related to and/or provide examples of the theme), where the correlation between the themes and respective theme elements may be stored in theme element database 114 (e.g., as shown in FIG. 4) in one embodiment. Theme elements may also include "tokens" or alternative forms of a word (e.g., "speaks," "spoke," "spoken" and "speaking" may be tokens of the word "speak" as shown in FIG. 5), where the tokens may be included in the theme database (e.g., 114) and/or included in a separate database (e.g., token database 115). The plurality of themes may include a major theme (e.g., where a distribution of instances of at least one theme element in the text falls within a predetermined range, where one instance of a portion is located toward the beginning of the text and another instance of the portion is located toward the end of the text, etc.), a minor theme (e.g., where a distribution of instances of at least one theme element in the text does not fall within a predetermined range, etc.), a complementary theme (e.g., where a distribution of instances of a portion in the text falls within a predetermined range, at least one other portion is associated with a major theme, etc.), a potential major theme (e.g., where a distribution of instances of a portion in the text falls within a predetermined range, etc.), some combination thereof, etc. In one embodiment, step 220 may be performed in accordance with process 300 of FIGS. 3A, 3B and/or 3C.

As shown in FIG. 2, step 230 involves assigning a plurality of scores to the plurality of themes (e.g., determined in step 220). Each theme may receive a respective score based on one or more attributes, where the one or more attributes may include a respective frequency of a respective plurality of theme elements for each theme in the text (e.g., based on a number of instances of the respective theme elements in the text with respect to a length of the text), a respective distribution of a respective plurality of theme elements for each theme in the text (e.g., based on the distances between consecutive instances of the respective theme elements in the text, where a "distance" between instances of at least one theme element may be expressed in a number of characters, words, symbols, etc.), at least one respective location of each theme in the text (e.g., based on whether at least one instance of a theme is located toward the beginning and/or end of the text). In one embodiment, the scores assigned in step 230 may be determined in accordance with process 600 of FIG. 6.

Step 240 involves determining an overall score for the text based on the plurality of scores (e.g., assigned in step 230). The overall score may be calculated by summing the plurality of scores (e.g., the respective scores assigned to each theme in step 230) in one embodiment. And in one embodiment, the overall score determined in step 240 may indicate an importance or value of the text (e.g., based on one or more themes of the text).

Accordingly, process 200 may be used to determine an overall score for a text based on information within the text (e.g., internal information). Process 200 may be advantageously used to determine an overall score for a text where few or no external hyperlinks (e.g., within at least one other text) point to the text. Additionally, process 200 may be advantageously used to determine an overall score for a text (e.g., intended to be shared within private network 160) which includes confidential information. In this manner, more relevant search results can be returned to a user by using internal information (e.g., with reduced reliance upon external information) to perform ranking operations and/or filtering operations associated with a search.

Figure 3A:
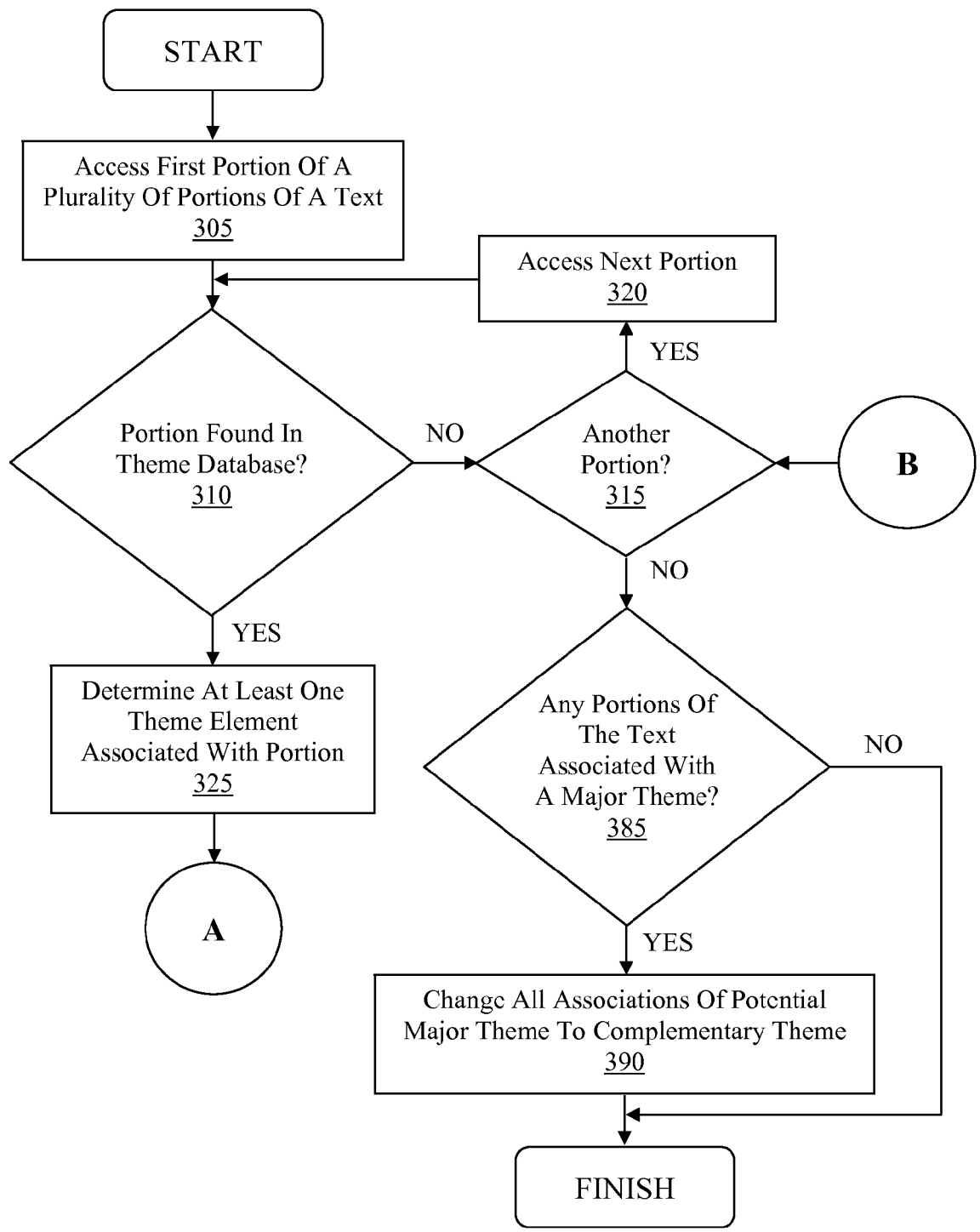
FIG. 3A shows a first portion of a flowchart of an exemplary computer-implemented process for determining at least one theme associated with a text in accordance with one embodiment of the present invention.
Figure 3B:
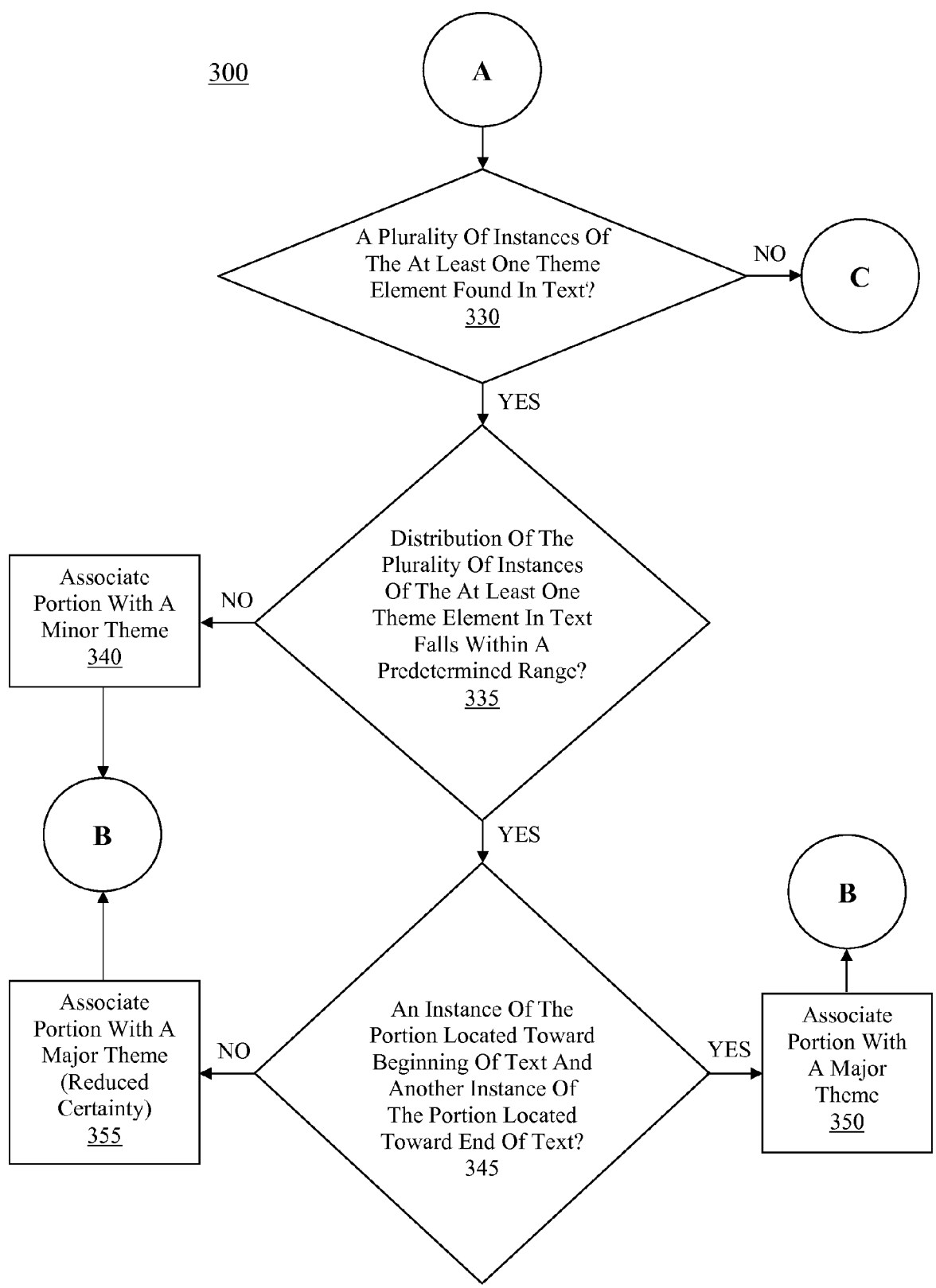
FIG. 3B shows a second portion of a flowchart of an exemplary computer-implemented process for determining at least one theme associated with a text in accordance with one embodiment of the present invention.
Figure 3C:
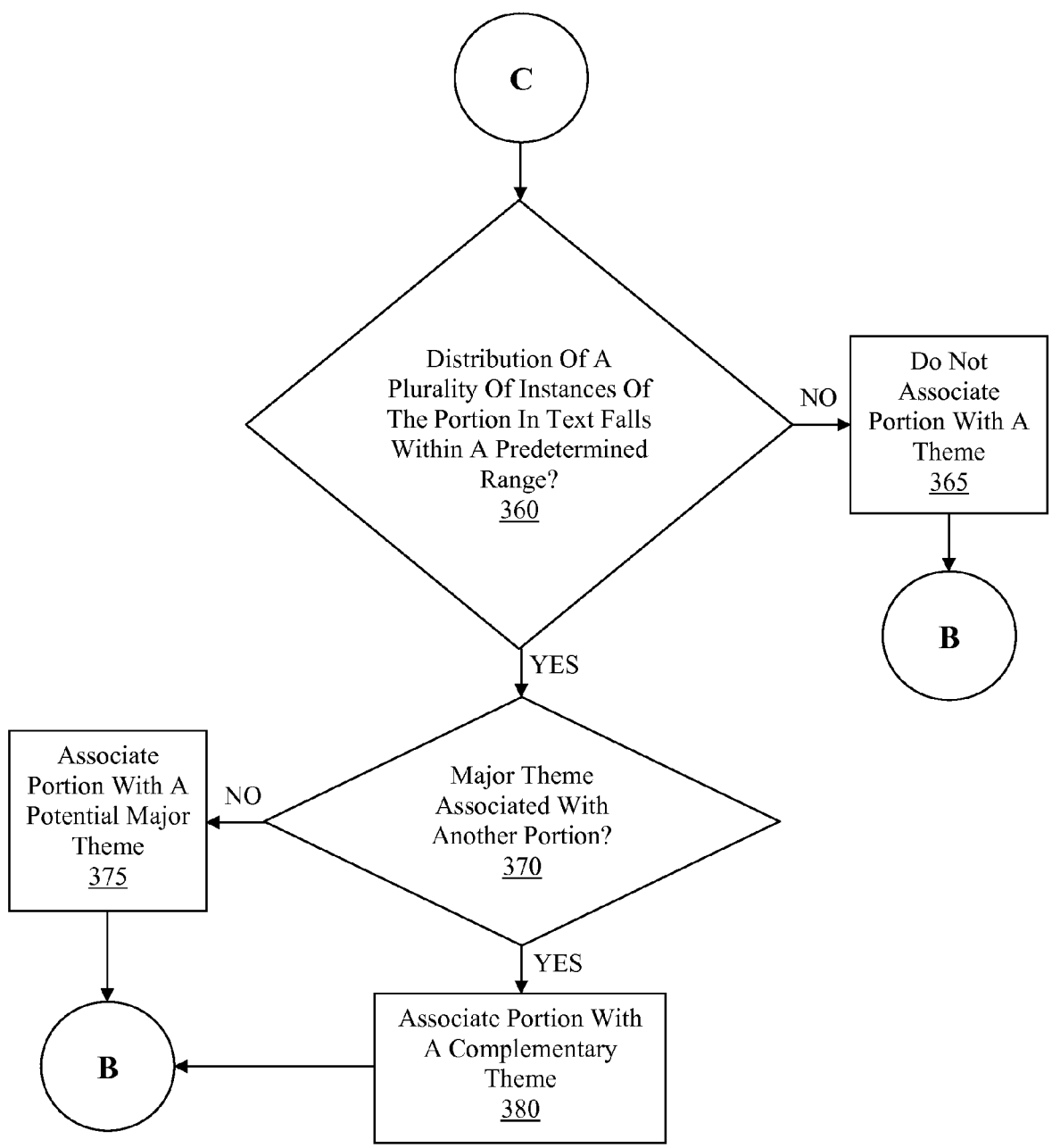
FIG. 3C shows a third portion of a flowchart of an exemplary computer-implemented process for determining at least one theme associated with a text in accordance with one embodiment of the present invention.

FIGS. 3A, 3B and 3C show a flowchart of exemplary computer-implemented process 300 for determining at least one theme associated with a text in accordance with one embodiment of the present invention. As shown in FIG. 3A, step 305 involves accessing a first portion of a plurality of portions of a text. The text may be a webpage, an electronic document (e.g., Microsoft Word document, Microsoft Excel spreadsheet, Adobe PDF, etc.), an electronic book, etc. The plurality of portions may be determined in accordance with step 210 of process 200 in one embodiment. Additionally, the first portion may be accessed from a database (e.g., text database 112, text database 190, etc.) in one embodiment.

Step 310 involves determining whether the portion (e.g., the first portion accessed in step 305 or another portion accessed in step 320) is found in a theme database (e.g., 114). Step 310 may be performed by comparing at least one character of a portion to at least one entry in the theme database (e.g., 114).

If the portion is not found in the theme database (e.g., the portion includes a word which is not a theme listed in the theme database), then it may be determined whether the text includes another portion in step 315. If the text does not include another portion, then step 385 may be performed as discussed herein. Alternatively, if the text does include another portion, then the next portion may be accessed in step 320 and then step 310 may be performed with respect to the next portion.

Alternatively, if the portion is found in the theme database (e.g., the portion includes the word "food" which is a theme listed in the theme database as shown in FIG. 4), then at least one theme element associated with the portion may be determined in step 325. For example, if the portion includes the word "food," then it may be determined that the words "bread," "meat," "fruit" and "nuts" are theme elements associated with the portion. A theme element may include one or more words which are related to and/or provide examples of the theme. Theme elements may also include "tokens" or alternative forms of a word (e.g., "speaks," "spoke," "spoken" and "speaking" may be tokens of the word "speak" as shown in FIG. 5), where the tokens may be included in the theme database (e.g., 114) and/or included in a separate database (e.g., token database 115). As such, in one embodiment, step 325 may involve determining at least one token associated with a theme, where the token may be determined by indexing theme database 114 and/or token database 115. In one embodiment, step 325 may be performed by indexing theme database 114 using at least one character of the portion (e.g., the word "food") to return the theme elements of "bread," "meat," "fruit" and "nuts" (e.g., as shown in FIG. 4).

As shown in FIG. 3B, step 330 involves determining whether a plurality of instances of the at least one theme element (e.g., determined in step 325) are found in the text. Step 330 may involve performing one or more word searches of the text to identify a plurality of instance of the at least one theme element. For example, a first word search of the text may be performed to identify any instances of the theme element "bread," a second word search of the text may be performed to identify any instances of the theme element "meat," etc. If a plurality of instances of the at least one theme element (e.g., a plurality of instances of only one theme element, at least one instance of a first theme element and at least one instance of a second theme element, etc.) are found in the text in step 330, then step 335 may be performed.

Step 335 involves determining whether a distribution of the plurality of instances of the at least one theme element in the text (e.g., identified in step 330) falls within a predetermined range. In one embodiment, a distribution falling within a predetermined range may be considered to be an "even distribution," whereas a distribution falling outside of the predetermined range may be considered to be an "uneven distribution." In one embodiment, the distribution (e.g., of the plurality of instances of the at least one theme element in the text) may be determined by averaging the "distances" (e.g., the number of words, characters, symbols, etc.) between each consecutive pair of instances of the at least one theme element. Each consecutive pair may include: two instances of the same theme element; or an instance of one theme element and an instance of another theme element. As such, in one embodiment, step 335 may involve calculating the average "distance" and comparing it to a predetermined range, where the predetermined range may vary based upon a length (e.g., number of words, characters, symbols, etc.) of the text.

If it is determined in step 335 that the average distance does not fall within the predetermined range, then the portion may be associated with a minor theme in step 340 and then step 315 may be performed. Alternatively, if it determined in step 335 that the average distance does fall within the predetermined range, then step 345 may be performed.

As shown in FIG. 3B, step 345 involves determining whether an instance of the portion is located toward the beginning of the text and another instance of the portion is located toward the end of the text. For example, step 345 may involve determining whether a first instance of the portion is found within a predetermined number of words, characters, symbols, etc. from the beginning of the text. As another example, step 345 may involve determining whether a second instance of the portion is found within a predetermined number of words, characters, symbols, etc. from the end of the text. If it is determined in step 345 that an instance of the portion is located toward the beginning of the text and another instance of the portion is located toward the end of the text, then the portion may be associated with a major theme in step 350 and then step 315 may be performed. Alternatively, if it is determined in step 345 that an instance of the portion is not located toward the beginning of the text and/or another instance of the portion is not located toward the end of the text, then the portion may be associated with a major theme in step 355 and then step 315 may be performed.

In one embodiment, step 355 may also involve noting that association of the portion with a major theme is performed with reduced certainty (e.g., compared to the association performed in step 350). This notation may be used later in determining a score for the theme, an overall score for the text, in an application which utilizes the overall score (e.g., a search which uses the overall score to rank a plurality of texts, filter a plurality of texts, etc.), etc.

If a plurality of instances of the at least one theme element (e.g., a plurality of instances of only one theme element, at least one instance of a first theme element and at least one instance of a second theme element, etc.) are not found in the text in step 330, then it may be determined in step 360 as shown in FIG. 3C whether a distribution of a plurality of instances of the portion in the text falls within a predetermined range. In one embodiment, a distribution falling within a predetermined range may be considered to be an "even distribution," whereas a distribution falling outside of the predetermined range may be considered to be an "uneven distribution." In one embodiment, the distribution (e.g., of the portion in the text) may be determined by averaging the "distances" (e.g., the number of words, characters, symbols, etc.) between each consecutive pair of instances of the portion. As such, in one embodiment, step 360 may involve calculating the average "distance" and comparing it to a predetermined range, where the predetermined range may vary based upon a length (e.g., number of words, characters, symbols, etc.) of the text.

If it is determined in step 360 that the average distance does not fall within the predetermined range, then the portion may not be associated with any themes in step 365 and then step 315 may be performed. Alternatively, if it determined in step 360 that the average distance does fall within the predetermined range, then step 370 may be performed.

As shown in FIG. 3C, step 370 involves determining whether a major theme has been associated with another portion (e.g., as performed in step 350 or 355 for another portion). If it is determined in step 370 that a major theme has not yet been associated with another portion, then the portion may be associated with a potential major theme in step 375 and then step 315 may be performed. Alternatively, if it is determined in step 370 that a major theme has been associated with another portion, then the portion may be associated with a complementary theme in step 380 and then step 315 may be performed.

Turning back to FIG. 3A, step 385 may be performed if it is determined in step 315 that the text does not include another portion (e.g., that steps 310 and 325 to 380, or some combination thereof, have been performed with respect to all portions of the text). Step 385 involves determining whether any portions of the text are associated with a major theme. If it is determined in step 385 that at least one portion of the text is associated with a major theme, then all associations of potential major theme may be changed in step 390 to complementary theme (e.g., any portion which has been previously associated with a potential major theme in step 375 may instead be associated with a complementary theme). Alternatively, if it is determined in step 385 that no portions of the text are associated with a major theme, then process 300 may terminate.

Figure 6:
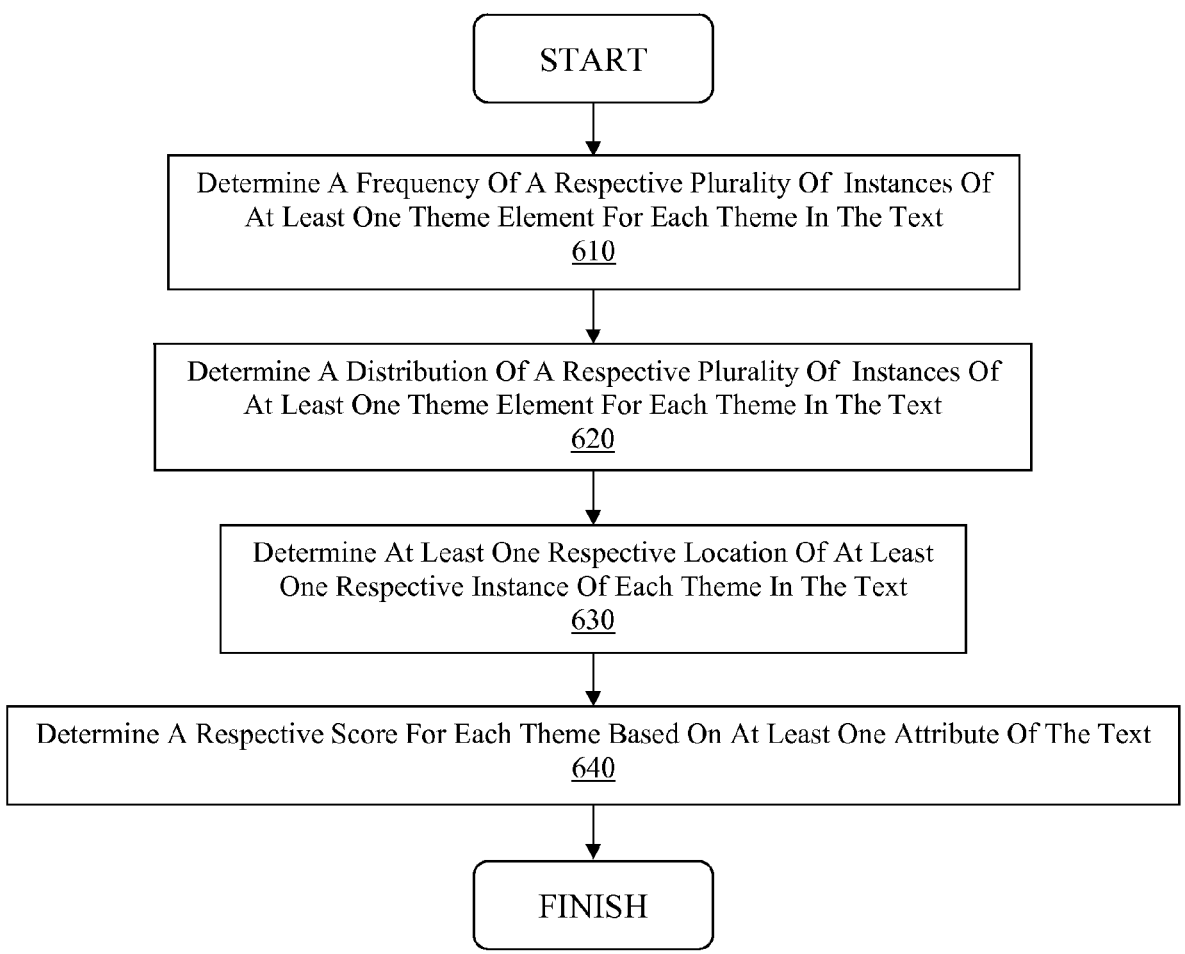
FIG. 6 shows a flowchart of an exemplary computer-implemented process for determining a plurality of scores to a plurality of themes in accordance with one embodiment of the present invention.

FIG. 6 shows a flowchart of exemplary computer-implemented process 600 for determining a plurality of scores to a plurality of themes in accordance with one embodiment of the present invention. As shown in FIG. 6, step 610 involves determining a frequency of a respective plurality of instances of at least one theme element for each theme in the text. In one embodiment, the frequency of theme elements for a particular theme may be determined by dividing the number of instances of the theme elements associated with the particular theme (e.g., including standard forms of the theme elements, tokens of the theme elements, some combination thereof, etc.) by the length of the text (e.g., expressed as a number of words, characters, symbols, etc.), where this may be repeated for each theme of the text. In one embodiment, the frequency of theme elements for a particular theme may be determined by the number of instances of the theme elements associated with the particular theme (e.g., including standard forms of the theme elements, tokens of the theme elements, some combination thereof, etc.). And in other embodiments, the frequency of a respective plurality of theme elements for each theme in the text may be alternatively determined in step 610.

Step 620 involves determining a distribution of a respective plurality of instances of at least one theme element for each theme in the text. In one embodiment, the distribution of theme elements for a particular theme may be determined by averaging the "distances" (e.g., the number of words, characters, symbols, etc.) between each consecutive pair of instances of the theme elements, where this may be repeated for each theme of the text. Each consecutive pair may include: two instances of the same theme element (e.g., a standard form of the theme element, a token of the theme element, some combination thereof, etc.); or an instance of one theme element (e.g., a standard form of the theme element, a token of the theme element, some combination thereof, etc.) and an instance of another theme element (e.g., a standard form of the theme element, a token of the theme element, some combination thereof, etc.).

As shown in FIG. 6, step 630 involves determining at least one respective location of at least one respective instance of each theme (e.g., at least one respective portion which is associated with each theme) in the text. In one embodiment, step 630 may involve determining whether at least one instance of a particular theme is located toward the beginning of the text (e.g., within a predetermined number of words, characters, symbols, etc. from the beginning of the text). In one embodiment, step 630 may involve determining whether at least one instance of a particular theme is located toward the end of the text (e.g., within a predetermined number of words, characters, symbols, etc. from the end of the text).

Step 640 involves determining a respective score for each theme based on at least one attribute of the text. For example, step 640 may involve determining a respective score for each theme based on a frequency of a plurality of instances of at least one theme element for the theme in the text (e.g., as determined in step 610), a distribution of a plurality of instances of at least one theme element for the theme in the text (e.g., as determined in step 620), a location of at least one instance of the theme in the text (e.g., as determined in step 630), some combination thereof, etc.

In one embodiment, a respective score for each theme may be calculated in step 640 by summing a plurality of scores (e.g., determined using attribute scoring database 116). For example, a first score associated with a frequency may be determined from attribute scoring database 116 (e.g., shown in FIG. 7) based on a frequency (e.g., expressed as a fraction, percentage, etc.) determined in step 610. As another example, a second score associated with a distribution may be determined from attribute scoring database 116 (e.g., shown in FIG. 7) based on a distribution (e.g., an average "distance" expressed in terms of words, characters, symbols, etc.) determined in step 620. As yet another example, a third score associated with a location may be determined from attribute scoring database 116 (e.g., shown in FIG. 7) based on a location (e.g., toward the beginning of the text, toward the end of the text, toward both the beginning and end of the text, etc.) determined in step 630.

In one embodiment, the respective scores for each theme in a text (e.g., as determined in step 640) may be stored in text scoring database 113 as shown in FIG. 8. As shown in FIG. 8, text scoring database 116 may include at least one respective theme associated with each text (e.g., as determined using process 300), a respective theme type corresponding to each theme (e.g., as determined using process 300), and a respective score corresponding to each theme (e.g., as determined using process 600).

Figure 9:
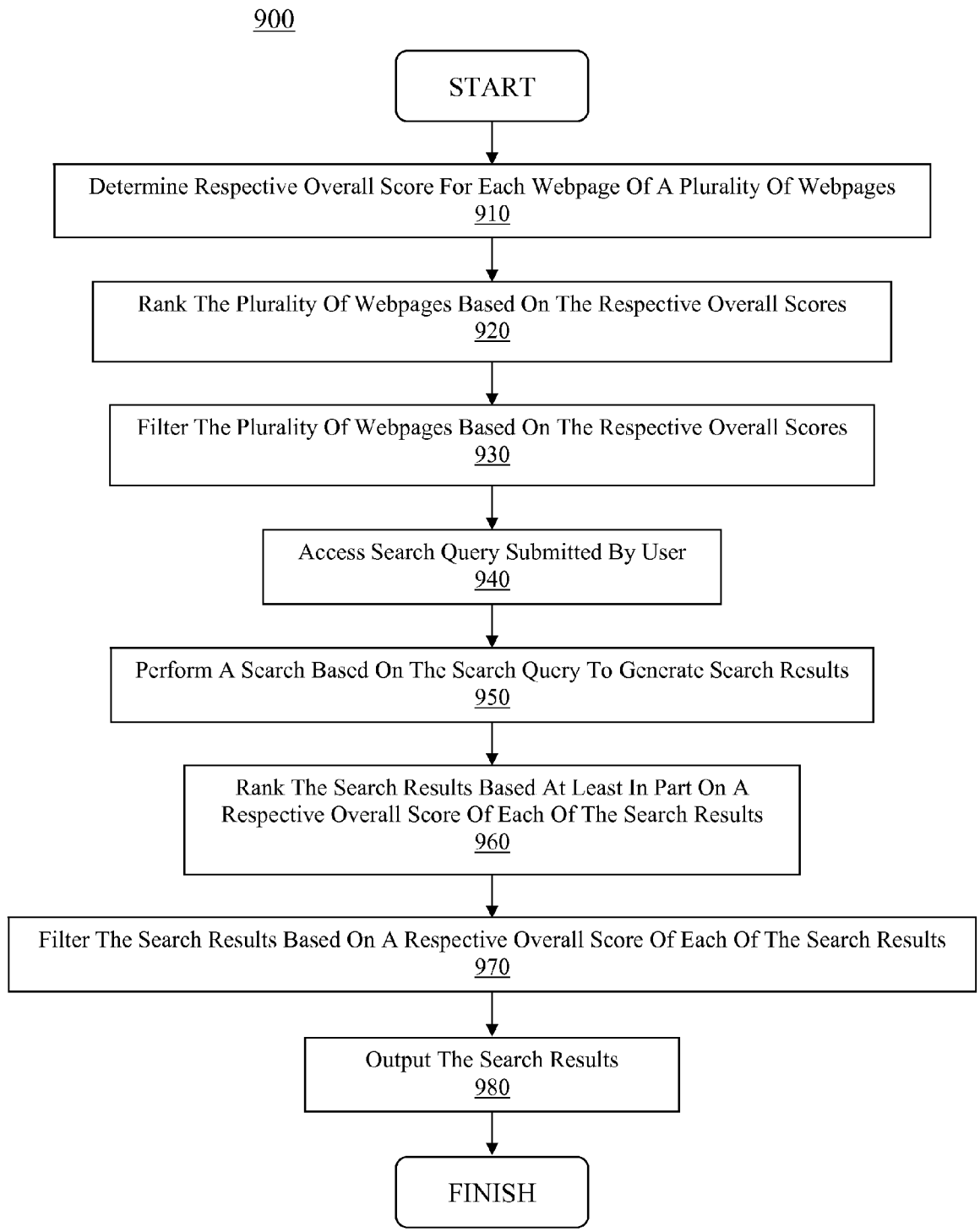
FIG. 9 shows a flowchart of an exemplary computer-implemented process for performing one or more operations associated with a search in accordance with one embodiment of the present invention.

FIG. 9 shows a flowchart of exemplary computer-implemented process 900 for performing one or more operations associated with a search in accordance with one embodiment of the present invention. As shown in FIG. 9, step 910 involves determining a respective overall score for each webpage of a plurality of webpages. In one embodiment, step 910 may be performed in accordance with process 300 of FIG. 3, where process 300 may be repeated for each webpage of the plurality of webpages.

Step 920 involves ranking the plurality of webpages based on the respective overall scores. For example, the webpages may be arranged in order of increasing respective overall score, decreasing respective overall score, etc. The ranking performed in step 920 may be performed before a search of the plurality of webpages is performed in one embodiment. And in one embodiment, step 920 may be performed by a ranking component (e.g., 140).

As shown in FIG. 9, step 930 involves filtering the plurality of webpages based on the respective overall scores. For example, step 930 may involve identifying a subset of the plurality of webpages which have respective overall scores above a predetermined threshold. The filtering performed in step 930 may be performed before a search of the plurality of webpages is performed in one embodiment. And in one embodiment, step 930 may be performed by a filtering component (e.g., 130).

Step 940 involves accessing a search query submitted by a user. The search query may include at least one character, at least one word, at least one symbol, etc. In one embodiment, the search query may be input using a graphical user interface.

As shown in FIG. 9, step 950 involves performing a search based on the search query (e.g., accessed in step 940) to generate search results (e.g., including at least one webpage). The search may be a keyword search based on one or more portions of the search query in one embodiment. And in one embodiment, step 950 may be performed by a search engine (e.g., 120).

Step 960 involves ranking the search results based at least in part on a respective overall score of each of the search results. For example, the search results may be arranged in order of increasing respective overall score, decreasing respective overall score, etc. The ranking performed in step 960 may be performed after the search of the plurality of webpages is performed in step 950 in one embodiment. In one embodiment, step 960 may be performed by a ranking component (e.g., 140). And in one embodiment, step 960 may involve scaling the respective overall scores of the search results (e.g., performed in accordance with process 1000 of FIG. 10) and then ranking the search results based on a respective scaled overall score of the search results.

Figure 10:
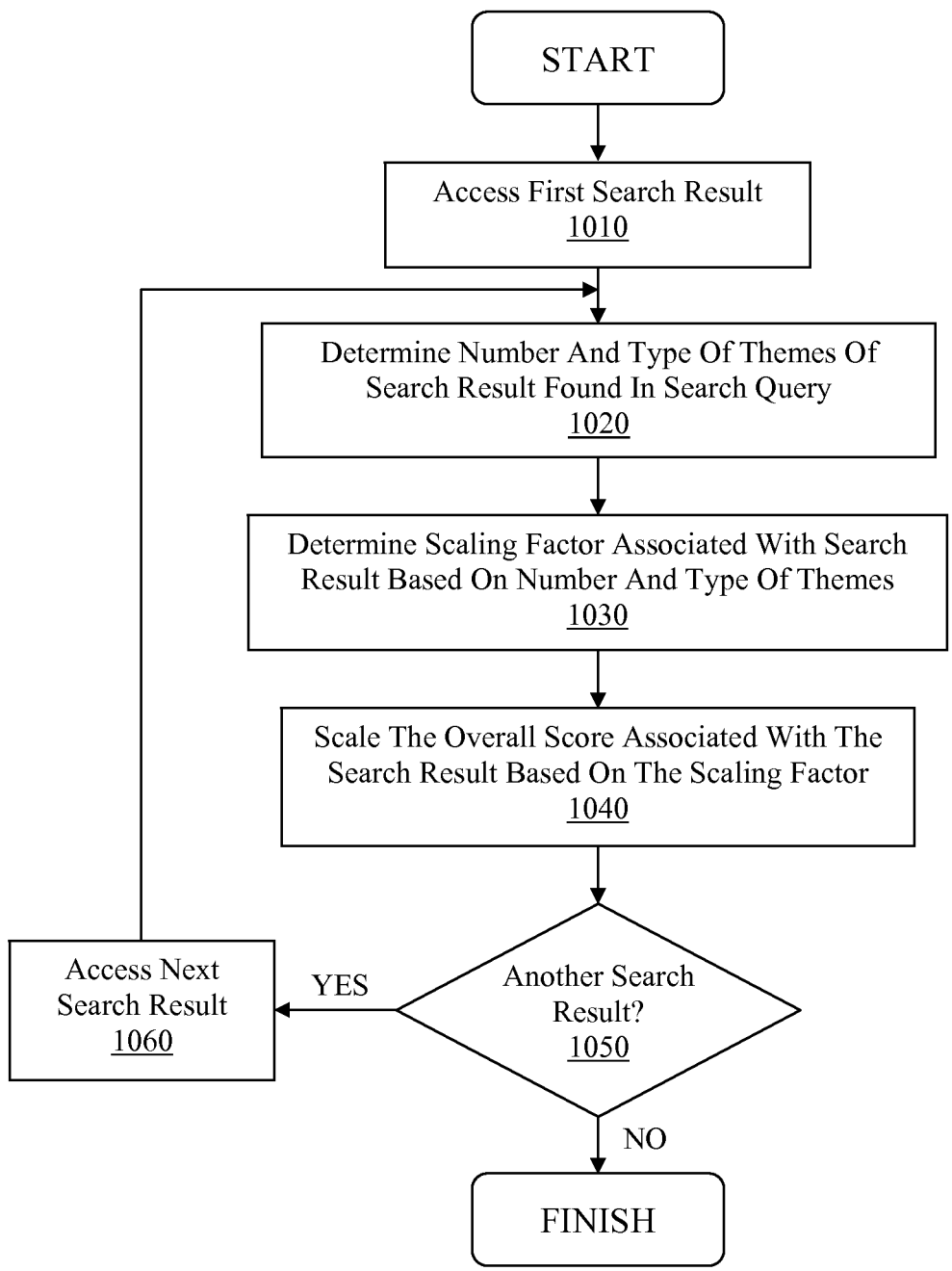
FIG. 10 shows a flowchart of an exemplary computer-implemented process for scaling a plurality of respective overall scores of a plurality of texts in accordance with one embodiment of the present invention.

FIG. 10 shows a flowchart of exemplary computer-implemented process 1000 for scaling a plurality of respective overall scores of a plurality of texts in accordance with one embodiment of the present invention. As shown in FIG. 10, step 1010 involves accessing a first search result. The first search result may be included in a plurality of search results generated as a result of a search (e.g., as performed in step 950 of process 900).

Step 1020 involves determining the number and type of themes of the search result which are found in the search query (e.g., submitted by a user in step 940 of process 900). In one embodiment, the number and type of themes may be determined using text scoring database 113 (e.g., as shown in FIG. 8).

As shown in FIG. 10, step 1030 involves determining a scaling factor associated with the search result based on the number and type of themes. In one embodiment, the scaling factor "S" may be calculated using the equation $$S = N_{major} * V_{major} + N_{comp} * V_{comp} + N_{potentialmajor} * V_{potentialmajor} + N_{minor} * V_{minor}$$

where $N_{major}$ may be the number of major themes of the search result (e.g., "Text 1" as shown in FIG. 8 has two major themes, etc.), where $N_{comp}$ may be the number of complementary themes of the search result (e.g., "Text 3" as shown in FIG. 8 has two complementary themes, etc.), where $N_{potentialmajor}$ may be the number of potential major themes of the search result (e.g., "Text 3" as shown in FIG. 8 has one potential major theme, etc.), and where $N_{minor}$ may be the number of minor themes of the search result (e.g., "Text 2" as shown in FIG. 8 has two minor themes, etc.). $V_{major}$ may be a numerical value or weight associated with a major theme, $V_{comp}$ may be a numerical value or weight associated with a complementary theme, $V_{potentialmajor}$ may be a numerical value or weight associated with a potential major theme, and $V_{minor}$ may be a numerical value or weight associated with a minor theme. In one embodiment, a respective weight associated with a given theme type may be determined using Table 1.

TABLE 1

| Theme Type | Weight |
| --- | --- |
| Major | 5 |
| Complementary | 4 |
| Potential Major | 3 |
| Minor | 2 |

Step 1040 involves scaling the overall score associated with the search result based on the scaling factor (e.g., determined in step 1030). The overall score may be accessed from text scoring database 113 in one embodiment. In one embodiment, the scaling factor may be multiplied by the overall score to calculate a scaled overall score in step 1040. And in one embodiment, the scaled overall score may be stored in text scoring database 113.

As shown in FIG. 10, step 1050 involves determining whether another search result exists. If another search result is identified, then the next search result may be accessed in step 1060 and step 1020 through 1040 may be repeated for the next search result. Alternatively, if another search result is not identified in step 1050, then process 1000 may conclude.

Turning back to FIG. 9, step 970 involves filtering the search results based on a respective overall score of each of the search results. For example, step 970 may involve identifying a subset of the search which have respective overall scores (e.g., with or without applying a scaling factor determined in accordance with process 1000) above a predetermined threshold. The filtering performed in step 970 may be performed after the search of the plurality of webpages is performed in step 950 in one embodiment. And in one embodiment, step 970 may be performed by a filtering component (e.g., 130).

Step 980 involves outputting the search results (e.g., generated in step 950, ranked in step 960, filtered in step 970, etc.). The search results may be output for display (e.g., on a display device of a computer system), printing (e.g., on a printer coupled to a computer system), storage (e.g., on a computer-readable medium of a computer system), etc.

Accordingly, process 900 may be used to return more relevant search results by utilizing internal information (e.g., with reduced reliance upon external information) to perform ranking operations and/or filtering operations associated with a search. Process 900 may be advantageously used to perform at least one operation related to a search for a text where few or no external hyperlinks (e.g., within at least one other text) point to the text. Additionally, process 900 may be advantageously used to perform at least one operation related to a search for a text (e.g., intended to be shared within private network 160) which includes confidential information. And in one embodiment, at least one search may be performed using internal information in combination with external information to return search results.

Although process 900 has been described with respect to webpages, it should be appreciated that process 900 may be used to search for any type of document, file, or other type of text. Additionally, it should be appreciated that one or more of the steps of process 900 may be optional, and therefore, may not be performed in other embodiments.

The information of theme element database 114 as depicted in FIG. 4 is merely exemplary, and thus, it should be appreciated that theme element database 114 may include a more or less information, different information, etc. in other embodiments. Additionally, the information of token database 115 as depicted in FIG. 5 is merely exemplary, and thus, it should be appreciated that token database 115 may include a more or less information, different information, etc. in other embodiments. The information of attribute scoring database 116 as depicted in FIG. 7 is merely exemplary, and thus, it should be appreciated that attribute scoring database 116 may include a more or less information, different information, etc. in other embodiments. Further, the information of text scoring database 113 as depicted in FIG. 8 is merely exemplary, and thus, it should be appreciated that text scoring database 113 may include a more or less information, different information, etc. in other embodiments.

Figure 11:
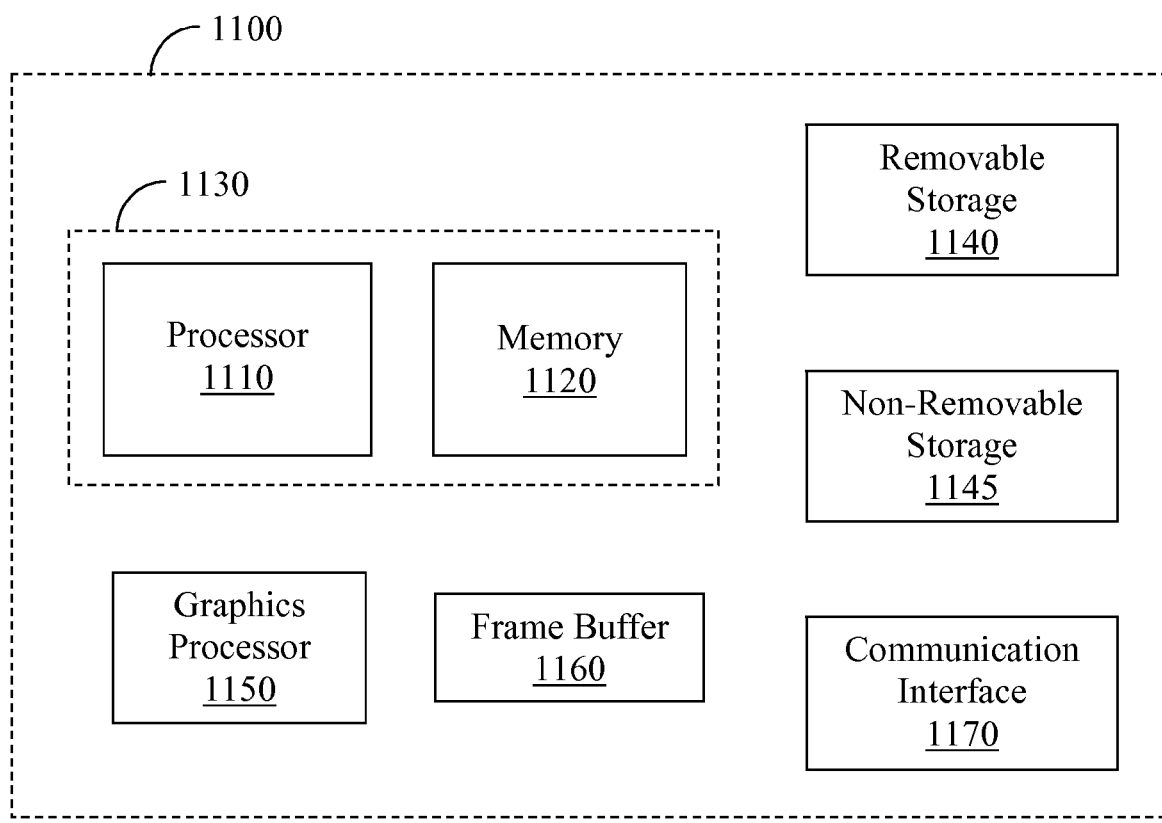
FIG. 11 shows an exemplary computer system platform upon which embodiments of the present invention may be implemented.

FIG. 11 shows exemplary computer system platform 1100 upon which embodiments of the present invention may be implemented. As shown in FIG. 11, portions of the present invention may be implemented by execution of computer-readable instructions or computer-executable instructions that may reside in components of computer system platform 1100 and which may be used as a part of a general purpose computer network. It is appreciated that computer system platform 1100 of FIG. 11 is merely exemplary. As such, the present invention can operate within a number of different systems including, but not limited to, general-purpose computer systems, embedded computer systems, laptop computer systems, hand-held computer systems, portable computer systems, stand-alone computer systems, game consoles, gaming systems or machines (e.g., found in a casino or other gaming establishment), or online gaming systems.

In one embodiment, computer system platform 1100 may be used to implement content server 110, computer system 120, computer system 130, computer system 140, computer system 150, computer system 110, computer system 170, some combination thereof, etc. And in one embodiment, one or more components of computer system platform 1100 may be disposed in and/or coupled with a housing or enclosure.

In one embodiment, depicted by dashed lines 1130, computer system platform 1100 may include at least one processor 1110 and at least one memory 1120. Processor 1110 may include a central processing unit (CPU) or other type of processor. Depending on the configuration and/or type of computer system environment, memory 1120 may include volatile memory (e.g., RAM), non-volatile memory (e.g., ROM, flash memory, etc.), or some combination of the two. Additionally, memory 1120 may be removable, non-removable, etc.

In other embodiments, computer system platform 1100 may include additional storage (e.g., removable storage 1140, non-removable storage 1145, etc.). Removable storage 1140 and/or non-removable storage 1145 may include volatile memory, non-volatile memory, or any combination thereof. Additionally, removable storage 1140 and/or non-removable storage 1145 may include CD-ROM, digital versatile disks (DVD) or other optical storage, magnetic cassettes, magnetic tape, magnetic disk storage or other magnetic storage devices, or any other medium which can be used to store information for access by computer system platform 1100.

As shown in FIG. 11, computer system platform 1100 may communicate with other systems, components, or devices via communication interface 1170. Communication interface 1170 may embody computer readable instructions, data structures, program modules or other data in a modulated data signal (e.g., a carrier wave) or other transport mechanism. By way of example, and not limitation, communication interface 1170 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 1170 may also couple computer system platform 1100 to one or more input devices (e.g., a keyboard, mouse, pen, voice input device, touch input device, etc.). In one embodiment, communication interface 1170 may couple computer system platform 1100 to one or more output devices (e.g., a display, speaker, printer, etc.).

As shown in FIG. 11, graphics processor 1150 may perform graphics processing operations on graphical data stored in frame buffer 1160 or another memory (e.g., 1120, 1140, 1145, etc.) of computer system platform 1100. Graphical data stored in frame buffer 1160 may be accessed, processed, and/or modified by components (e.g., graphics processor 1150, processor 1110, etc.) of computer system platform 1100 and/or components of other systems/devices. Additionally, the graphical data may be accessed (e.g., by graphics processor 1150) and displayed on an output device coupled to computer system platform 1100. Accordingly, memory 1120, removable storage 1140, non-removable storage 1145, fame buffer 1160, or a combination thereof, may be a computer-readable medium or computer-usable medium and may include instructions that when executed by a processor (e.g., 1110, 1150, etc.) implement a method of scoring one or more texts (e.g., in accordance with process 200 of FIG. 2), a method of determining at least one theme associated with a text (e.g., in accordance with process 300 of FIG. 3A, FIG. 3B and/or FIG. 3C), a method of determining a plurality of scores to a plurality of themes (e.g., in accordance with process 600 of FIG. 6), a method of performing one or more operations associated with a search (e.g., in accordance with process 900 of FIG. 9), a method of scaling a plurality of respective overall scores of a plurality of texts (e.g., in accordance with process 1000 of FIG. 10), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of scoring a text, said method implemented by a computer processor, said method comprising:
   determining a plurality of themes associated with a plurality of portions of said text, wherein each portion of said plurality of portions comprises at least one respective character;
   assigning a plurality of scores to said plurality of themes, wherein each score of said plurality of scores corresponds to a respective theme of said plurality of themes; and
   determining an overall score for said text by summing based on said plurality of scores for said text, and wherein if a distribution of a plurality of instances of a portion of said plurality of portions falls within a predetermined range and if a major theme is associated with at least one other portion of said text, associating said portion with a complementary theme.

2. The method of claim 1, wherein said text is selected from a group consisting of a webpage, an electronic document, and an electronic book.

3. The method of claim 1 further comprising:
   determining said plurality of portions of said text using phrase chunking.

4. The method of claim 1, wherein said determining said plurality of themes further comprises:
   determining at least one theme element associated with a portion of said plurality of portions;
   if a distribution of a plurality of instances of said at least one theme element falls within a predetermined range and if a first instance of said portion is located toward a beginning of said text and if a second instance of said portion is located toward an end of said text, associating said portion with a major theme; and
   if said distribution of said plurality of instances of said at least one theme element does not fall within said predetermined range, associating said portion with a minor theme.

5. The method of claim 1, wherein said assigning a plurality of scores further comprises determining a respective score for each theme based on an attribute selected from a group consisting of a respective frequency of a respective plurality of instances of at least one theme element for each theme in said text, a respective distribution of a respective plurality of instances of at least one theme element for each theme in said text, and at least one respective location of each theme in said text.

6. The method of claim 1 further comprising:
accessing a search query submitted by a user;
performing a search of at least one webpage based on said search query to generate search results, wherein said search results comprise said text; and
ranking said search results based on respective overall scores of said search results.

7. The method of claim 6, wherein said ranking further comprises ranking said search results based on a number and type of respective themes, associated with each of said search results, in said search query.

8. The method of claim 6 further comprising:
filtering said search results based on a respective overall score of each of said search results, wherein said filtering further comprises filtering said search results to identify at least one search result.

9. The method of claim 6 further comprising:
ranking said at least one webpage based on a respective overall score of each of said at least one webpage.

10. The method of claim 6 further comprising:
filtering a plurality of webpages based on a respective overall score of each of said plurality of webpages, wherein said filtering further comprises filtering said plurality of webpages to identify said at least one webpage.

11. A non-transitory computer-readable medium having computer-readable program code embodied therein for causing a computer system to perform a method of scoring a text, said method comprising:
determining a plurality of themes associated with a plurality of portions of said text, wherein each portion of said plurality of portions comprises at least one respective character, wherein said determining said plurality of themes further comprises:
determining at least one theme element associated with a portion of said plurality of portions;
if a distribution of a plurality of instances of said at least one theme element falls within a predetermined range and if a first instance of said portion is located toward a beginning of said text and if a second instance of said portion is located toward an end of said text, then associating said portion with a major theme; and
if said distribution of said plurality of instances of said at least one theme element does not fall within said predetermined range, then associating said portion with a minor theme;
assigning a plurality of scores to said plurality of themes, wherein each score of said plurality of scores corresponds to a respective theme of said plurality of themes; and
determining an overall score for said text based on said plurality of scores.

12. The non-transitory computer-readable medium of claim 11, wherein said text is selected from a group consisting of a webpage, an electronic document, and an electronic book.

13. The non-transitory computer-readable medium of claim 11, wherein said method further comprises:
determining said plurality of portions of said text using phrase chunking.

14. The non-transitory computer-readable medium of claim 11, wherein said determining said plurality of themes further comprises:
if a distribution of a plurality of instances of said portion of said plurality of portions falls within a predetermined range and if said major theme is associated with at least one other portion of said text, associating said portion with a complementary theme.

15. The non-transitory computer-readable medium of claim 11, wherein said assigning a plurality of scores further comprises determining a respective score for each theme based on an attribute selected from a group consisting of a respective frequency of a respective plurality of instances of at least one theme element for each theme in said text, a respective distribution of a respective plurality of instances of at least one theme element for each theme in said text, and at least one respective location of each theme in said text.

16. The non-transitory computer-readable medium of claim 11, wherein said method further comprises:
accessing a search query submitted by a user;
performing a search of at least one webpage based on said search query to generate search results, wherein said search results comprise said text; and
ranking said search results based on respective overall scores of said search results.

17. The non-transitory computer-readable medium of claim 16, wherein said ranking further comprises ranking said search results based on a number and type of respective themes, associated with each of said search results, in said search query.

18. The non-transitory computer-readable medium of claim 16, wherein said method further comprises:
filtering said search results based on a respective overall score of each of said search results, wherein said filtering further comprises filtering said search results to identify at least one search result.

19. The non-transitory computer-readable medium of claim 16, wherein said method further comprises:
ranking said at least one webpage based on a respective overall score of each of said at least one webpage.

20. The non-transitory computer-readable medium of claim 16, wherein said method further comprises:
filtering a plurality of webpages based on a respective overall score of each of said plurality of webpages, wherein said filtering further comprises filtering said plurality of webpages to identify said at least one webpage.

21. A system comprising a processor and a memory, wherein said memory comprises instructions that when executed by said system implement a method of scoring a text, said method comprising:
determining a plurality of themes associated with a plurality of portions of said text, wherein each portion of said plurality of portions comprises at least one respective character, wherein said determining said plurality of themes further comprises, if a distribution of a plurality of instances of a portion of said plurality of portions falls within a predetermined range and if a major theme is associated with at least one other portion of said text, then associating said portion with a complementary theme;
assigning a plurality of scores to said plurality of themes, wherein each score of said plurality of scores corresponds to a respective theme of said plurality of themes; and
determining an overall score for said text based on said plurality of scores.

22. The system of claim 21, wherein said text is selected from a group consisting of a webpage, an electronic document, and an electronic book.

23. The system of claim 21, wherein said method further comprises:
   determining said plurality of portions of said text using phrase chunking.

24. The system of claim 21, wherein said determining said plurality of themes further comprises:
   determining at least one theme element associated with said portion of said plurality of portions;
   if a distribution of a plurality of instances of said at least one theme element falls within a predetermined range and if a first instance of said portion is located toward a beginning of said text and if a second instance of said portion is located toward an end of said text, associating said portion with a major theme; and
   if said distribution of said plurality of instances of said at least one theme element does not fall within said predetermined range, associating said portion with a minor theme.

25. The system of claim 21, wherein said assigning a plurality of scores further comprises determining a respective score for each theme based on an attribute selected from a group consisting of a respective frequency of a respective plurality of instances of at least one theme element for each theme in said text, a respective distribution of a respective plurality of instances of at least one theme element for each theme in said text, and at least one respective location of each theme in said text.

26. The system of claim 21, wherein said method further comprises:
   accessing a search query submitted by a user;
   performing a search of at least one webpage based on said search query to generate search results, wherein said search results comprise said text; and
   ranking said search results based on respective overall scores of said search results.

27. The system of claim 26, wherein said ranking further comprises ranking said search results based on a number and type of respective themes, associated with each of said search results, in said search query.

28. The system of claim 26, wherein said method further comprises:
   filtering said search results based on a respective overall score of each of said search results, wherein said filtering further comprises filtering said search results to identify at least one search result.

29. The system of claim 26, wherein said method further comprises:
   ranking said at least one webpage based on a respective overall score of each of said at least one webpage.

30. The system of claim 26, wherein said method further comprises:
   filtering a plurality of webpages based on a respective overall score of each of said plurality of webpages, wherein said filtering further comprises filtering said plurality of webpages to identify said at least one webpage.

* * * * *